US011269948B2

(12) United States Patent
Mizuno et al.

(10) Patent No.: US 11,269,948 B2
(45) Date of Patent: Mar. 8, 2022

(54) ELECTRONIC APPARATUS, METHOD FOR CONTROLLING ELECTRONIC APPARATUS, AND STORAGE MEDIUM (71) Applicant: CANON KABUSHIKI KAISHA, Tokyo (JP)

(72) Inventors: Takashi Mizuno, Tokyo (JP); Hiroyuki Owatari, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 38 days.

(21) Appl. No.: 16/785,280

(22) Filed: Feb. 7, 2020

(65) Prior Publication Data

US 2020/0278996 A1 Sep. 3, 2020

(30) Foreign Application Priority Data

Feb. 28, 2019 (JP) .............................. JP2019-036848

(51) Int. Cl.
*G06F 3/0484* (2013.01)
*G06F 16/583* (2019.01)
*G06F 3/0482* (2013.01)
*G06F 3/04845* (2022.01)

(52) U.S. Cl.
CPC .......... *G06F 16/583* (2019.01); *G06F 3/0482* (2013.01); *G06F 3/04845* (2013.01)

(58) Field of Classification Search
CPC ... G06F 16/583; G06F 3/0482; G06F 3/04845
See application file for complete search history.

(56) References Cited

U.S. PATENT DOCUMENTS

| 7,062,497 | B2 * | 6/2006 | Hamburg | G06F 40/166 |
| 2005/0063668 | A1 * | 3/2005 | Hosoi | G11B 27/32 |
| | | | | 386/283 |
| 2005/0091270 | A1 * | 4/2005 | Beilinson | G06F 16/51 |
| 2013/0346898 | A1 * | 12/2013 | Kokemohr | G06F 3/04845 |
| | | | | 715/769 |
| 2017/0013200 | A1 * | 1/2017 | Shirakawa | G01S 19/42 |
| 2020/0380739 | A1 * | 12/2020 | Ansorregui | H04L 9/0825 |

FOREIGN PATENT DOCUMENTS

JP 2009-225359 A 10/2009

* cited by examiner

*Primary Examiner* — Beau D Spratt
(74) *Attorney, Agent, or Firm* — Canon U.S.A., Inc. I.P. Division

(57) ABSTRACT

An electronic apparatus is provided and copies first history data indicating a content of image processing performed on a first image. In response to an instruction to append the copied first history data to a second image received, the electronic apparatus overwrites the second history data with the copied first history data and saves the copied first history data if a result of image processing performed on the second image using second history data is displayed on a first screen. The electronic apparatus adds the copied first history data and saves the copied first history data in association with the second image if a plurality of pieces of information corresponding to each of a plurality of second images is displayed on a second screen.

9 Claims, 6 Drawing Sheets

ELECTRONIC APPARATUS, METHOD FOR CONTROLLING ELECTRONIC APPARATUS, AND STORAGE MEDIUM

BACKGROUND

Field

The present disclosure relates to an electronic apparatus that performs image processing on an image, a method for controlling the electronic apparatus, and a non-transitory computer-readable storage medium storing a program therein.

Description of the Related Art

According to a conventional technology, an image is adjusted for edit items such as brightness, color, noise reduction, trimming, and rotation, and then the image that has been edited as desired by a user is outputted. A plurality of edit items is combined in different ways to edit an image, and the edit contents to the image are recorded as an edit history (Japanese Patent Application Laid-Open No. 2009-225359).

In some cases, it may be desired to edit an image with the same edit contents as those of a certain image. In such a case, an edit history recorded for the certain image can be copied to the other image, and the other image can be edited in accordance with the edit history thus copied. This saves a user from having to repeat the same adjustment to the same edit item for each image.

However, in a case where the other image has already been edited with different contents and such an edit history has been recorded, the edit history recorded for the other image cannot be retained if an edit history of the certain image is copied and overwritten.

SUMMARY

According to an aspect of the present disclosure, there is provided an electronic apparatus including a copy unit configured to copy first history data indicating a content of image processing performed on a first image, a reception unit configured to receive an instruction to append the copied first history data to a second image, a display unit configured to display a first screen or a second screen in a switchable manner, a result of image processing performed on one of a plurality of the second images using second history data is displayed on the first screen, and a plurality of pieces of information corresponding to each of the plurality of second images on the second screen, and a storage unit configured to perform control to, in response to the instruction received while the first screen is displayed, overwrite the second history data associated with the second image of the copied first history data and save the copied first history data, and in response to the instruction received while the second screen is displayed, add the copied first history data and save the copied first history data in association with the second image.

Further features of the present disclosure will become apparent from the following description of exemplary embodiments with reference to the attached drawings.

DESCRIPTION OF THE EMBODIMENTS

Hereinafter, an exemplary embodiment of this disclosure will be described in detail with reference to drawings. However, constituent elements described in the exemplary embodiment are merely examples, and the scope of this disclosure is not limited thereto.

Figure 1:
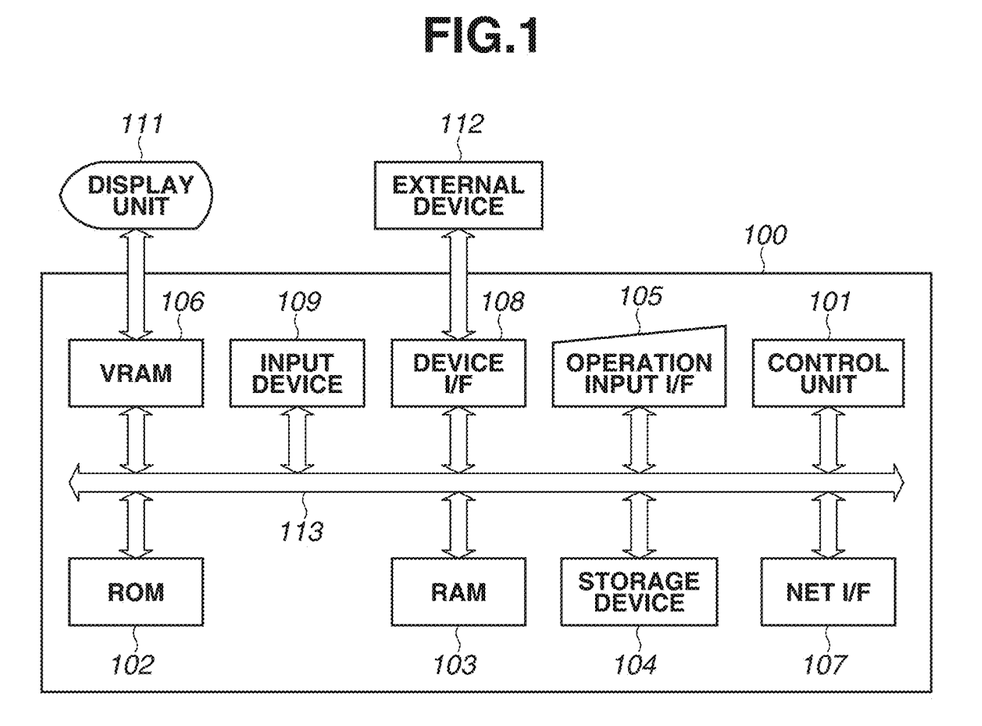
FIG. 1 is a block diagram illustrating an example of the configuration of an electronic apparatus according to the present exemplary embodiment.

FIG. 1 is a block diagram illustrating an example of the configuration of an electronic apparatus 100 according to the present exemplary embodiment. The electronic apparatus 100 includes a control unit 101, a read-only memory (ROM) 102, a random access memory (RAM) 103, a storage device 104, an operation input interface (I/F) 105, a video random access memory (VRAM) 106, a network I/F 107, a device I/F 108, and a system bus 113. The control unit 101 controls an overall operation of the electronic apparatus 100. The control unit 101 is, for example, a central processing unit (CPU) or a graphics processing unit (GPU). The ROM 102 stores various data such as programs or parameters non-temporarily. The RAM 103 temporarily stores various data. The storage device 104 is, for example, a semiconductor memory or a hard disk drive, and stores various data non-temporarily. The storage device 104 may or may not be detachable from the electronic apparatus 100.

The operation input I/F 105 is an interface to an input device 109 that receives a user operation. In the present exemplary embodiment, the operation input I/F 105 is a touch screen. The VRAM 106 connects to a display unit 111 that displays a variety of images, via a display interface. The display unit 111 may be, for example, a liquid crystal panel and a backlight module, an organic electro-luminescence (EL) panel, and the like. In the present exemplary embodiment, as the electronic apparatus 100, a smartphone terminal or a tablet terminal is used, and a touch screen in which the input device 109 and the display unit 111 are integrated with each other is used. In a case where the input device 109 is the touch screen, the control unit 101 can detect operations including: an operation of touching the touch screen with a finger or a stylus pen (hereinafter, called a "touch-down"); a state in which the touch screen is touched with a finger or a stylus pen (hereinafter, called a "touch-on"); an operation of touching the touch screen with a finger or a stylus pen and moving the same on the touch screen (hereinafter, called a "move"); an operation of taking a finger or a stylus pen off the touch screen (hereinafter, called a "touch-up"); and a state in which nothing touches the touch screen (hereinafter, called a "touch-off"). Further, an operation for a user to tap on the touch screen, i.e., an operation in which a touch-down occurs, and before lapse of a first time period, a touch-up occurs with little movement, is called a "tap". Further, an operation in which a touch-down occurs, and before lapse of a second time period longer than the first time period, a touch-up occurs with little movement is called a "long tap". An operating system (OS) informs the control unit 101 of the operations and the position coordinate of the finger or stylus pen on the touch screen. The control unit 101 detects what kind of operation has been made on the touch screen based on the received information. As for a move, the moving direction of the finger or stylus pen on the touch screen can also be determined for each of the vertical and horizontal components on the touch screen on the basis of change in position coordinate. Further, in the case of a touch-down on the touch screen, a move of a certain distance or longer, and then a touch-up, such an operation is assumed to be a drop after a drag, namely, a drag and drop. The touch screen may be of any type such as a resistance film type, a capacitive type, a surface acoustic wave type, an infrared ray type, an electromagnetic induction type, an image recognition type, and an optical sensor type.

The network 107 is an interface for connecting the electronic apparatus 100 to a network such as the Internet. The device I/F 108 is an interface for communication with an external device 112 such as an image capturing apparatus. The system bus 113 is a bus that connects the control unit 101, the ROM 102, the RAM 103, the storage device 104, the operation input I/F 105, the display I/F 106, the network I/F 107, and the device I/F 108, which enables communication therebetween.

In the present exemplary embodiment, the control unit 101 starts up an image editing application software program stored in the storage device 104 and operates each of the modules described above in accordance with the image editing application software program, so that an image file is read out from the storage device 104 and image processing is performed. The image processing includes processing for adjusting parameters such as exposure and white balance to develop raw image data and processing for rotating or trimming an image.

Figure 2:
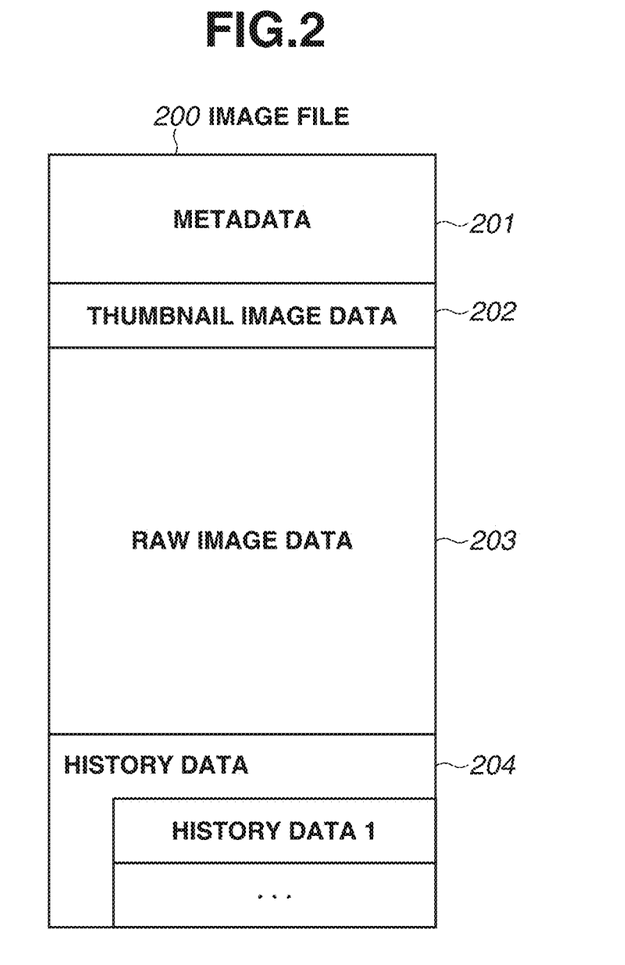
FIG. 2 is a block diagram illustrating an example of the configuration of an image file according to the present exemplary embodiment.

FIG. 2 is a block diagram illustrating an example of the configuration of an image file according to the present exemplary embodiment. Metadata 201 indicates attributes of an image file 200, for example, a file name, a file creation date and time, an image-capture date and time, and a file size. Thumbnail image data 202 is data that is acquired by performing development processing on an image signal obtained by image-capture processing and then compressing and coding the resultant in a JPEG format. Raw image data 203 is unprocessed data in which no development processing is performed on an image signal obtained by the image-capture processing. History data 204 is data in which items of a series of image processing applied to the raw image data 203 and parameters are held in the order of adjustment (in time series). The image processing items in the present exemplary embodiment are, for example, lens correction, brightness adjustment, white balance, and trimming.

In the present exemplary embodiment, a plurality of pieces of history data 204 can be saved in association with one image file. A plurality of edit contents can be applied to the raw image data 203 so that images representing different image processing results are output. In the present exemplary embodiment, however, the upper limit number is preset for the pieces of the history data 204 that can be saved in association with one image file. In the present exemplary embodiment, description is provided below in which the upper limit number is 4.

In the present exemplary embodiment, the description is given of a case in which the history data 204 is recorded in the image file 200 such that the history data 204 is appended to the raw image data 203. However, the present exemplary embodiment is not limited thereto. For example, it is only required that the history data 204 is associated with the image file 200. The history data 204 may be stored in the storage device 104 separately from the image file 200.

Figure 3:
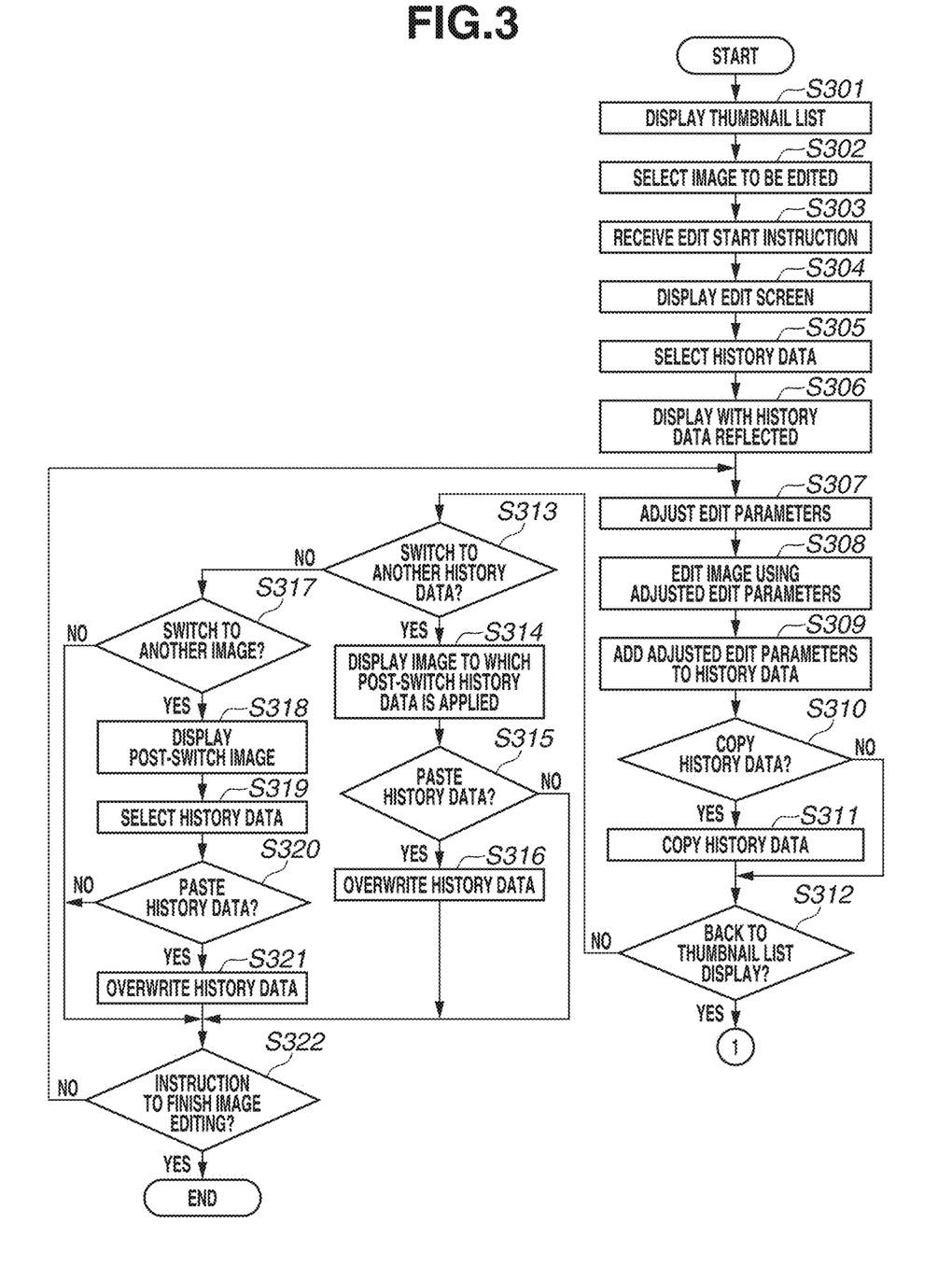
FIG. 3 is a flowchart illustrating an example of operation of an electronic apparatus according to the present exemplary embodiment.

FIG. 3 is a flowchart illustrating an example of operation of an electronic apparatus 100 according to the present exemplary embodiment. The following operation is realized by the control unit 101 that starts up an image editing application software program stored in the storage device 104 and operates each of the modules described above in accordance with the image editing application software program.

Figure 5A:
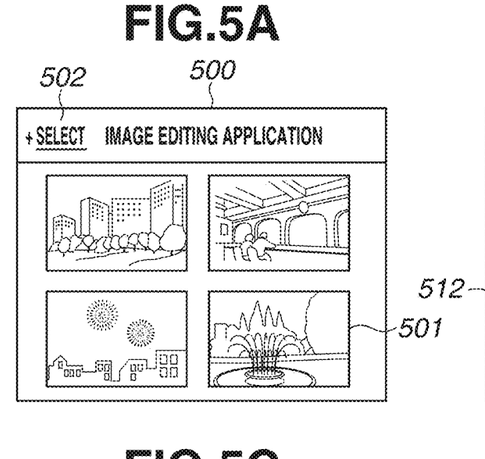
FIGS. 5A to 5F are diagrams illustrating examples of a screen displayed on a display unit of an electronic apparatus according to the present exemplary embodiment.

In step S301, the control unit 101 reads out the thumbnail image data 202 from the plurality of image files 200 stored in the storage device 104 and displays, in the display unit 111, a thumbnail list view 500 having a plurality of thumbnail images 501 lined up as illustrated in FIG. 5A.

Figure 5B:
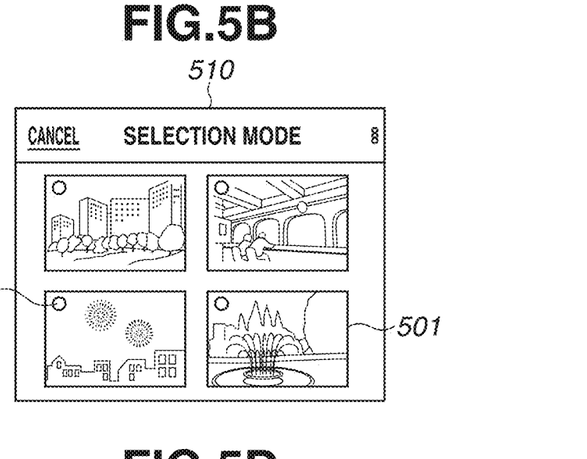
Figure 5C:
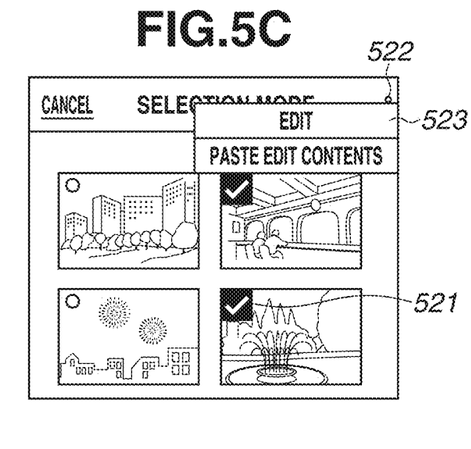

In response to a tap operation on a select icon 502, the control unit 101 enters a selection mode to display a selection screen 510 as illustrated in FIG. 5B. In step S302, in response to a tap operation on a thumbnail image 501 of the selection screen 510, a thumbnail image is selected. Referring to FIG. 5B, marks 512 indicating a state in which the thumbnail images 501 are selectable are displayed. Referring to FIG. 5C, in response to a tap operation on the thumbnail images 501, checkmarks 521 representing a state in which the thumbnail images 501 are selected are displayed.

Figure 6A:
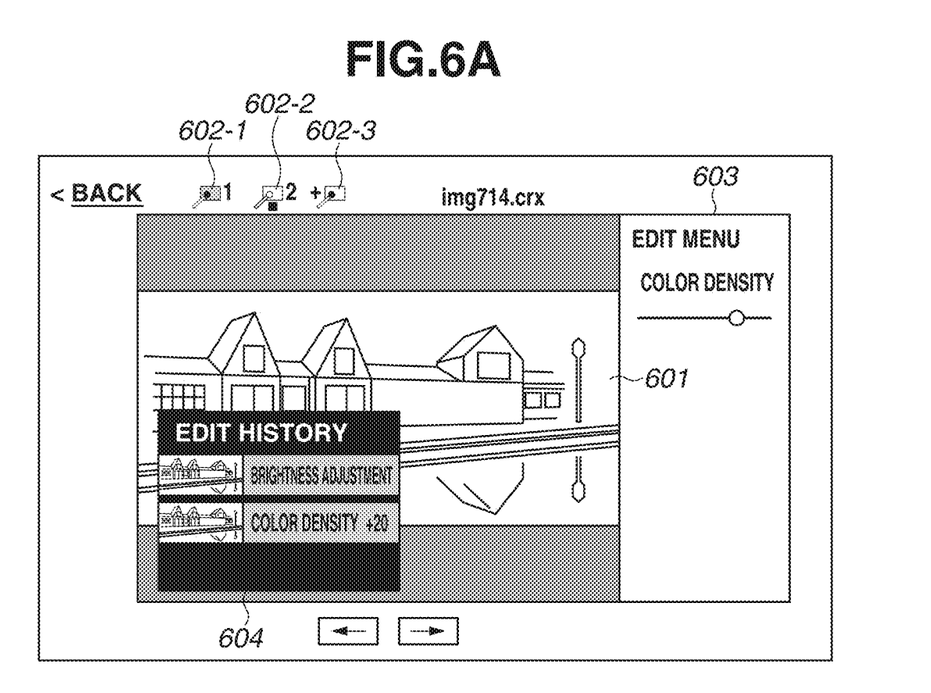
FIGS. 6A and 6B are diagrams illustrating examples of a screen displayed on a display unit of an electronic apparatus according to the present exemplary embodiment.
Figure 6B:
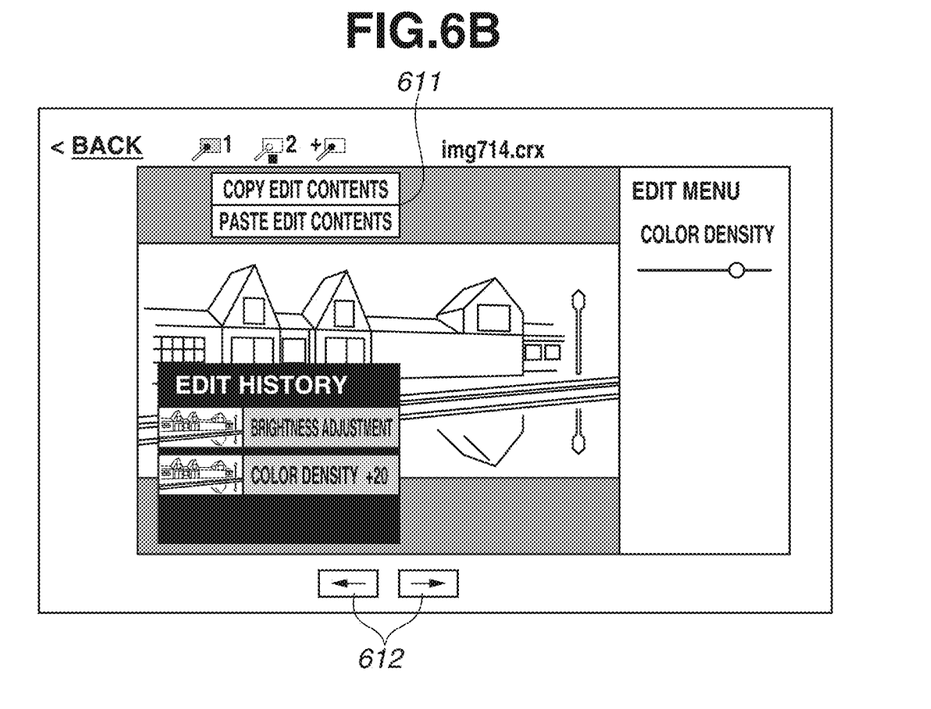

In response to a tap operation on a menu icon 522, the control unit 101 displays a menu 523 indicating processing that can be performed on image files corresponding to the selected thumbnail images. In step S303, in response to a tap operation on "edit" region of the menu 523, the control unit 101 receives an edit start instruction, and in step S304, the control unit 101 displays an edit screen 600 illustrated in FIG. 6A. The control unit 101 reads out the raw image data 203 from an image file 200 corresponding to the thumbnail image 501 selected in step S302, performs the development processing, and displays the resultant in an image display region 601. In the edit screen 600, a tab 602 corresponding to the history data 204 held in the image file 200 corresponding to the selected thumbnail image 501 is displayed. Referring to FIG. 6A, two tabs of a tab 602-1 and a tab 602-2 are displayed. Further, in response to a tap operation on a rightmost tab 602-3, history data can be added to the image file until the number of pieces of history data reaches the upper limit number (in the present exemplary embodiment, 4 in total). An edit menu 603 includes edit items such as brightness or color adjustment, color density, noise reduction, trimming, and rotation. Parameters of the edit items are adjusted by moving a slider or entering a numerical value. A combination of the parameters adjusted in the edit items is recorded in the image file 200 as the history data 204. The control unit 101 performs image processing on the raw image data 203 of the image file 200 in accordance with the parameters of the edit items stored in the history data 204, and outputs an image representing the result thereof.

In step S305, in response to a tap operation on the tab 602, the control unit 101 selects history data on the image file 200. Referring to FIG. 6A, the tab 602-2 is selected. In step S306, the control unit 101 uses a set value of the history data 204 corresponding to the selected tab 602-2 perform image processing on the raw image data 203. The control unit 101 then displays an image representing the result thereof in the image display region 601. The control unit 101 also displays the history data 204 corresponding to the selected tab 602-2 in a history dialog 604. The history dialog 604 of FIG. 6A indicates that "brightness adjustment" was made to the raw image data 203 of an image file "img714.crx", and then a value of "color density" was adjusted to "+20".

In step S307, in response to a user operation performed on the edit items displayed in the edit menu 603, the control unit 101 adjusts the parameters. Then, in step S308, the control unit 101 uses the adjusted parameters to perform image processing on the raw image data 203, and displays an image indicating the result of image processing in the image display region 601.

In step S309, the control unit 101 then adds the edit items and parameters adjusted in step S307 to the history data 204 selected in step S305.

In response to a long tap operation on the tab 602 by the user, the control unit 101 displays a list 611 of processing that can be performed on history data corresponding to the tab 602. If a tap operation is performed on "copy edit contents" of the list 611 (YES in step S310), then in step S311, the control unit 101 performs processing for copying history data corresponding to the selected tab 602. If a tap operation is not performed on "copy edit contents" of the list 611 (NO in step S310), then the processing proceeds to step S312.

Figure 4:
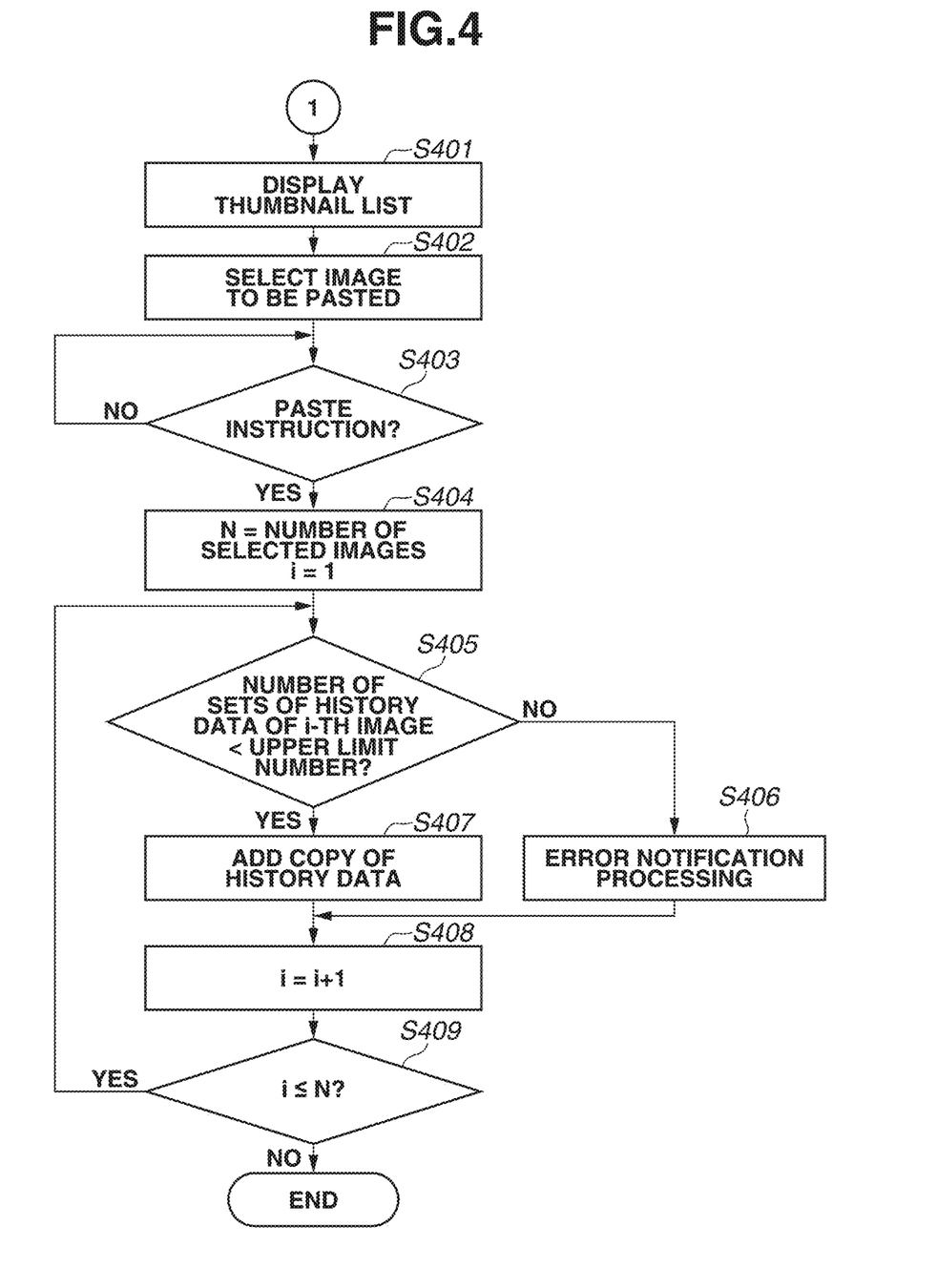
FIG. 4 is a flowchart illustrating an example of operation of an electronic apparatus according to the present exemplary embodiment.

If a tap operation is performed on "back" of an image feed icon 612 (YES in step S312), then the control unit 101 performs the processing depicted in the flowchart of FIG. 4. If no tap operation is performed on "back" of an image feed icon 612 (NO in step S312), the processing proceeds to step S313, and the control unit 101 determines whether or not an instruction to switch to another tab has been received. In a case where a tap operation on another tab 602 is detected, the control unit 101 determines that an instruction to switch to another existing tab or an instruction to add a new tab to switch to the new tab has been received. In a case where an instruction to switch to another tab is given, in step S314, the control unit 101 uses history data corresponding to the post-switch tab to perform image processing on the raw image data, and displays the resulting image. The control unit 101 then displays the list 611 of processing that can be performed on history data corresponding to the post-switch tab 602. If a tap operation is performed on "paste edit contents" of the list 611 (YES in step S315), then the processing proceeds to step S316. In step S316, the history data corresponding to the post-switch tab 602 is overwritten, for saving, with the copied history data. This reduces the need for the user to repeatedly adjust the raw image data to be edited in the same manner as that of the copied history data, and then enables the user to subsequently make another adjustment.

In a case where no instruction to switch to another tab is received (NO in step S313), in step S317, the control unit 101 determines whether or not an instruction to switch to another image has been received. In response to a tap operation on an image feed icon 612 received, the control unit 101 determines that a switch instruction has been given. If a switch instruction is given (YES in step S317), then the control unit 101 selects in a predetermined order, as an edit target, an image file 200 before or after the image file 200 that is the current edit target. Then, in step S318, the control unit 101 reads out the raw image data 203 of the edit target image file, performs the development processing, and displays the resultant in the image display region 601. In step S319, in response to a tap operation on the tab 602, the control unit 101 selects history data on the post-switch image file 200. The control unit 101 then displays the list 611 of processing that can be performed on history data corresponding to the selected tab 602. If a tap operation is performed on "paste edit contents" of the list 611 (YES in step S320), the processing proceeds to step S321. Then, in step S321, the history data corresponding to the selected tab 602 is overwritten, for saving, with the copied history data. This reduces the need for the user to repeatedly adjust the post-switch raw image data to be edited in the same manner as that of the copied history data, and then enables the user to subsequently make another adjustment.

In the present exemplary embodiment, for example, history data of the image file "img714.crx" can be copied and pasted into another image file. To be specific, first, history data corresponding to the second tab 602 of the image file "img714.crx" is copied. Next, the edit target is changed to an image file "img715.crx", and the result of image processing on raw image data of the image file "img715.crx" and the tab 602 corresponding to the history data are displayed together in the edit screen 600. Then, while the result of image processing on the image file "img715.crx" is displayed, the history data corresponding to the selected tab 602 is overwritten with the copied history data of the image file "img714.crx". When the user further adjusts the raw image data of the image file "img715.crx", a new edit content is added to the history data and recorded.

When the control unit 101 receives, in response to a predetermined operation, an instruction to finish the image processing (YES in step S322), the processing is finished. The predetermined operation is, for example, a tap operation on a button to close the edit screen 600.

As described above, in the present exemplary embodiment, an image obtained through image processing using history data that is being selected is displayed on the screen, which allows the user to confirm the history data that is being selected. The selected history data is overwritten with the copied history data. This makes it possible to select and delete unnecessary history data and to add necessary history data. This is useful, particularly, in a case where the upper limit is set for the number of pieces of history data that can be held in the image file.

FIG. 4 is a flowchart depicting processing that is performed by the control unit 101 after a tap operation by the user on "back" of an image feed icon 612 is received in step S312, namely, after an instruction to go back to the display of the thumbnail list is received.

In step S401, the control unit 101 reads out the thumbnail image data 202 from the plurality of image files 200 stored in the storage device 104 and displays, in the display unit 111, the thumbnail list view 500 as illustrated in FIG. 5A.

Figure 5D:
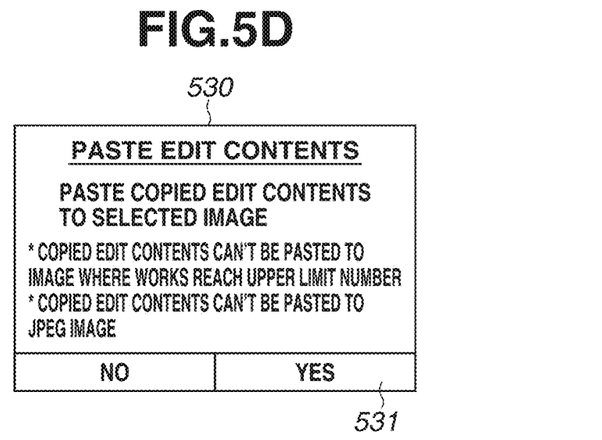

In step S402, in response to a tap operation by the user on a select icon 502, the control unit 101 enters a selection mode to display a selection screen 510 as illustrated in FIG. 5B. Then, in response to a tap operation on at least one of the plurality of thumbnail images 501 displayed on the selection screen 510, the control unit 101 selects a thumbnail image 501. In step S403, the control unit 101 determines whether or not an instruction to paste the history data copied in step S310 has been received. In the present exemplary embodiment, in response to a tap operation on "paste edit contents" of the menu 523 of FIG. 5C, an inquiry screen 530 of FIG. 5D is displayed. In response to a tap operation on "YES" of choices 531, it is determined that a paste instruction has been received. If a paste instruction has been received (YES in step S403), the processing proceeds to step S404. In step S404, the control unit 101 sets the number of thumbnail images selected in step S402 to a variable N, and sets a count number "i" to "1".

In step S405, the control unit 101 compares the number of pieces of history data 204 held in the image file 200 corresponding to the i-th thumbnail image of the selected thumbnail images and the preset upper limit number. If the number of pieces of history data is equal to or greater than the upper limit number (NO in step S405), the processing proceeds to step S406. In step S406, error notification processing is performed and the processing proceeds to step S408.

In contrast, if the number of pieces of history data is smaller than the upper limit number (YES in step S405), the processing proceeds to step S407. In step S407, the control unit 101 adds the history data copied in step S311 to the image file 200 corresponding to the i-th thumbnail image for recording.

Figure 5E:
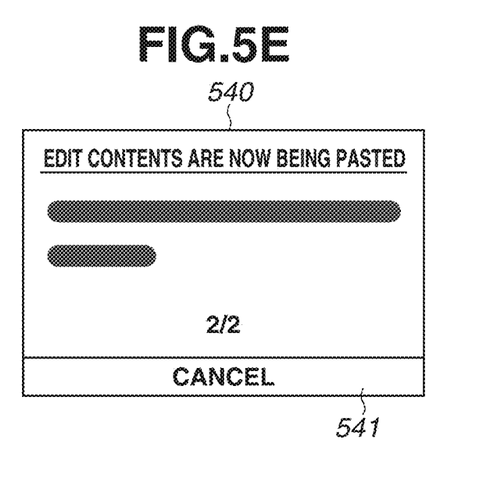

In step S408, the control unit 101 adds "1" to the count number "i". If the value of the count number "i" is equal to or smaller than the value of the variable N (YES in step S409), then the same processing is applied to the next thumbnail image. The control unit 101 displays a screen 540 indicating the progress of collective paste processing on the history data as illustrated in FIG. 5E while the processing is performed. FIG. 5E illustrates a state in which two image files 200 are selected in the selection processing of step S402 and the paste processing on one of the two image files 200 is finished and the paste processing is being performed on the other image file 200. In response to a tap operation on a "cancel" region 541, the processing is finished. If the value of the count number "i" is greater than the variable N (NO in step S408), then the processing is finished.

Figure 5F:
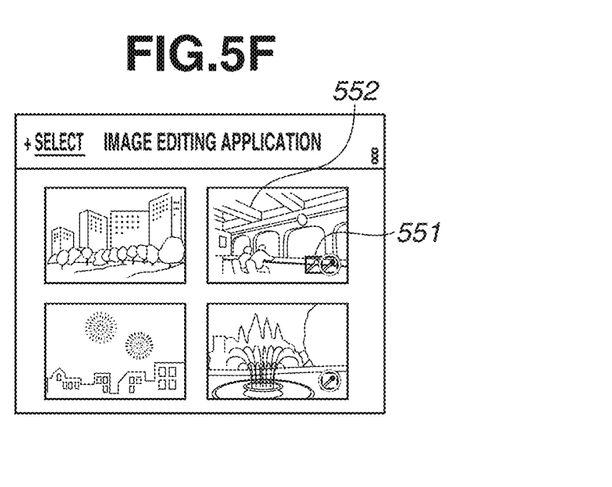

If the raw image data 203 of the image file 200 is edited and at least one piece of history data 204 is recorded, then an icon corresponding to the number of pieces of history data is superimposed on a thumbnail image of the image file and the resultant is displayed on the thumbnail list view 500. In FIG. 5F, two pieces of history data 204 are recorded in the image file 200 corresponding to a thumbnail image 552, and two icons 551 which correspond to the first history data 204 and the second history data 204 respectively are displayed. Further, at present, icons of the history data 204 applied to the raw image data of the image file 200 are displayed so as to be distinguishable from others. Referring to FIG. 5F, the icon 551 marked with a circle is displayed, which means that the second history data is applied. The case in which a circle mark is given is described in the present exemplary embodiment, however, the present exemplary embodiment is not limited thereto. For example, an icon may be displayed in a different color.

In the present exemplary embodiment, in a case where a history indicating contents of edit made to a certain image is copied to another image and recorded, it is possible to switch, depending on the edit state of the other image, between recording through overwriting a history of the other image with the copied history and recording through addition of the copied history to the history of the other image. This improves user convenience.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform functions of one or more of the above-described embodiment(s) and/or that includes one or more circuits e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-036848, filed Feb. 28, 2019, which is hereby incorporated by reference herein in its entirety.

What is claimed is:

1. An electronic apparatus comprising:
a processor; and
a memory storing a program which, when executed by the processor, causes the electronic apparatus to:
copy first history data indicating a content of image processing performed on a first image;
save one or more pieces of second history data indicating a content of image processing performed on a second image in association with the second image;
receive an instruction to save the copied first history data in association with the second image;
perform control to display a first screen or a second screen in a switchable manner, a one piece of a plurality of pieces of information corresponding to each of the plurality of second images being displayed on the first screen, and a plurality of pieces of information corresponding to each of the plurality of second images being displayed on the second screen; and
perform control to, in response to the instruction received while the first screen is displayed, overwrite the second history data with the copied first history data and save the copied first history data in association with the second image, and in response to the instruction received while the second screen is displayed, add the copied first history data and save the copied first history data additionally in association with the second image,
wherein, in a case where the first screen is displayed, image processing is performed on the second image using the second history data among a plurality of pieces of history data saved in association with the second image and the result of the image processing performed on the second image is being displayed as the one piece of the plurality of pieces of information corresponding to each of the plurality of second images on the first screen.

2. The electronic apparatus according to claim 1, wherein the second image is saved in association with a preset upper limit number of pieces of history data.

3. The electronic apparatus according to claim 2, wherein in a case where the instruction is received while the second screen is displayed and the upper limit number of pieces of history data is saved in association with the second image, the copied first history data is not saved in association with the second image.

4. The electronic apparatus according to claim 1, wherein the program when executed by the processor further causes the electronic apparatus to display, in the second screen, an icon corresponding to at least one piece of history data saved in association with the second image, the icon being displayed together with information corresponding to each of the plurality of second images.

5. The electronic apparatus according to claim 1, wherein the plurality of pieces of information corresponding to each of the plurality of second images displayed on the second screen are thumbnail images of the second images.

6. The electronic apparatus according to claim 1, wherein the first image is different from the second image.

7. The electronic apparatus according to claim 1, wherein the first image is the same as the second image.

8. A method for controlling an electronic apparatus, comprising:
   copying first history data indicating a content of image processing performed on a first image;
   saving one or more pieces of second history data indicating a content of image processing performed on a second image in association with the second image;
   receiving an instruction to save the copied first history data in association with the second image;
   performing control to display a first screen or a second screen in a switchable manner, one piece of a plurality of pieces of information corresponding to each of the plurality of second images being displayed on the first screen, and a plurality of pieces of information corresponding to each of the plurality of second images being displayed on the second screen; and
   performing control to, in response to the instruction received while the first screen is displayed, overwrite the second history data with the copied first history data and save the copied first history data in association with the second image, and in response to the instruction received while the second screen is displayed, add the copied first history data and save the copied first history data additionally in association with the second image,
   wherein, in a case where the first screen is displayed, image processing is performed on the second image using the second history data among a plurality of pieces of history data saved in association with the second image and the result of the image processing performed on the second image is being displayed as the one piece of the plurality of pieces of information corresponding to each of the plurality of second images on the first screen.

9. A non-transitory computer-readable storage medium storing instructions that, when executed by a processor, configures the processor to perform operations comprising:
   copying first history data indicating a content of image processing performed on a first image;
   saving one or more pieces of second history data indicating a content of image processing performed on a second image in association with the second image;
   receiving an instruction to save the copied first history data in association with the second image;
   performing control to display a first screen or a second screen in a switchable manner, one piece of a plurality of pieces of information corresponding to each of the plurality of second images being displayed on the first screen, and a plurality of pieces of information corresponding to each of the plurality of second images being displayed on the second screen; and
   performing control to, in response to the instruction received while the first screen is displayed, overwrite the second history data with the copied first history data and save the copied first history data in association with the second image, and in response to the instruction received while the second screen is displayed, add the copied first history data and save the copied first history data additionally in association with the second image,
   wherein, in a case where the first screen is displayed, image processing is performed on the second image using the second history data among a plurality of pieces of history data saved in association with the second image and the result of the image processing performed on the second image is being displayed as the one piece of the plurality of pieces of information corresponding to each of the plurality of second images on the first screen.

* * * * *